(12) United States Patent
Korn

(10) Patent No.: US 6,880,083 B1
(45) Date of Patent: Apr. 12, 2005

(54) METHOD AND APPARATUS FOR CREATING AND EXECUTING SECURE SCRIPTS

(75) Inventor: Rodney A. Korn, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,037

(22) Filed: Dec. 31, 1999

(51) Int. Cl.$^7$ ................................................. H04L 9/00
(52) U.S. Cl. ...................................... 713/170; 713/171
(58) Field of Search ................................. 713/170, 187, 713/171

(56) References Cited

U.S. PATENT DOCUMENTS

| | | | |
|---|---|---|---|
| 6,324,650 B1 * | 11/2001 | Ogilvie | 713/202 |
| 6,367,012 B1 * | 4/2002 | Atkinson et al. | 713/176 |
| 6,546,487 B1 * | 4/2003 | McManis | 713/169 |

OTHER PUBLICATIONS

Whittle, Robin, "Cryptography for Encryption, Digital Signatures and Authentication," www.ozemail.com.au/firstpr/crypto, printed Dec. 23, 1999, 20 pgs.

Aurili, Mikael, "Cryptography," http://courses.cs.vt.edu/cs3604/lib/Privacy/Aurili.4, html, printed Dec. 23, 1999, 4 pages.

"Internet Security: Email: Pretty Good Privacy (PGP)," www.waubonsie.com:8001/security/email.html, printed Dec. 23, 1999, 2 pages.

"Internet Security: Introduction to Encryption: What is cryptography?", www.waubonise.com:8001/security/intro.html, printed Dec. 23, 1999, 2 pages.

:Internet Security: World Wide Web: Secure Socket Layer(SSL), www.waubonsie.com:8001/security/www.html, printed Dec. 23, 1999, 4 pages.

"What is ActiveX?," Microsoft white paper, 3 pages.

* cited by examiner

Primary Examiner—Thomas R. Peeso
Assistant Examiner—Grigory Gurshman
(74) Attorney, Agent, or Firm—Crystal D. Sayles

(57) ABSTRACT

A method and apparatus for creating a secure script. Executable commands in the script are hashed, and the hashed values for the commands are encrypted and appended to the script. Before executing the script, a hashed value for each executable command in a script is computed and the encrypted hashed value appended to the script for each executable command in the script is decrypted to obtain a decrypted hashed value for each executable command in the script. The hashed value and the decrypted hashed value for each executable command is compared, and if the values are the same, the command is executed.

27 Claims, 2 Drawing Sheets

METHOD AND APPARATUS FOR CREATING AND EXECUTING SECURE SCRIPTS

BACKGROUND OF THE INVENTION

1. Field of the Invention

The present invention relates to the field of encryption. Specifically, the present invention relates to creating and executing secure, i.e., encrypted, scripts by a world wide web-enabled application.

2. Description of the Related Art

Present World Wide Web browsers, such as Internet Explorer, available from Microsoft Corporation, are limited by the constraints of the HyperText Mark-Up Language (HTML). Web content based on HTML comprises static, two dimensional text and graphics. A scripting language, such as JavaScript—a cross-platform, object-based scripting language for client and server applications developed by Netscape Communications, Inc., extends a Web browser's capabilities. A scripting language allows access to objects within the browser and supports execution of Web applications. A script, written in a scripting language, typically has access to browser objects in an HTML document or page, and is capable of modifying variables in the HTML document. Thus, the script extends the capabilities of HTML processing without requiring interaction with a HyperText Transfer Protocol (HTTP) server. The script typically is downloaded by the browser as part of an HTML page and is processed as the page is received, or when a browser event occurs, such as the click of a button on the HTML page.

A script differs from an applet. Although an applet also is downloaded as part of a Web page and run on a client system, the applet stands alone, that is, it is not part of the browser application, just as an application program, such as a word processor application, is not part of an operating system.

In addition to scripts and applets, controls enhance Web browsers. For example, ActiveX controls are interactive objects in a Web page that provide interactive and user-controllable functions. ActiveX controls are part of a set of technologies available from Microsoft Corporation, based on a refinement of the well known COM standard, that is directed to enabling interactive content for Web pages. ActiveX currently is supported by the Microsoft Windows operating system, but will be supported on other platforms, such as the Macintosh platform available from Apple Computer, and UNIX platforms.

Without sufficient security mechanisms in place, it is possible to download a Web page that contains controls that launch an application that causes harm or unintended results, e.g., to the client system. Furthermore, if the controls are not secure, the provider of a Web site risks attack by computer hackers, and is vulnerable to software bugs.

BRIEF SUMMARY OF THE INVENTION

The invention provides a method for creating a secure script. Executable commands in the script are hashed, and the hashed values for the commands are encrypted and appended to the script.

BRIEF DESCRIPTION OF THE DRAWINGS

The present invention is illustrated by way of example and not limitation in the following figures. Like references indicate similar elements, in which.

DETAILED DESCRIPTION OF THE INVENTION

An embodiment of the present invention enables Web pages to execute software applications on a client system, e.g., a personal computer (PC), in a secure manner using a signed control, and a signed and encrypted script. Embodiments of the invention may be represented as a software product received over, and/or stored on, a machine-readable medium (also referred to as a computer-readable medium or a processor-readable medium). The machine-readable medium may be any type of magnetic, optical, or electrical storage medium including a diskette, CD-ROM, memory device (volatile or non-volatile), or similar storage mechanism. Moreover, the machine readable medium may be accessed at a server by a client via a network connection between the client and server, for example, in a client/server computing environment. The machine-readable medium may contain various sets of instructions, code sequences, configuration information, or other data. For example, the procedures described herein can be stored on the machine-readable medium. Those of ordinary skill in the art will appreciate that other instructions and operations necessary to implement the described invention may also be stored on the machine-readable medium.

In one embodiment of the invention, a script in a World Wide Web page ("Web page", "Web document", or "HyperText Markup Language (HTML) document") is hashed and encrypted. A control in the Web page, such as ActiveX, decrypts and hashes the script to verify the script has not been altered or tampered with, before executing or causing to execute the script. In this manner, one can serve to a client web pages that contain interactive content or that execute local applications in a secure fashion. The described embodiment involves a script that may be invoked by a Web browser application, or more particularly, by a control in a Web page downloaded by the Web browser application. However, it should be noted that any application or software program can benefit from the present invention to protect malicious modification of or hacking to a script or the like.

Figure 1:
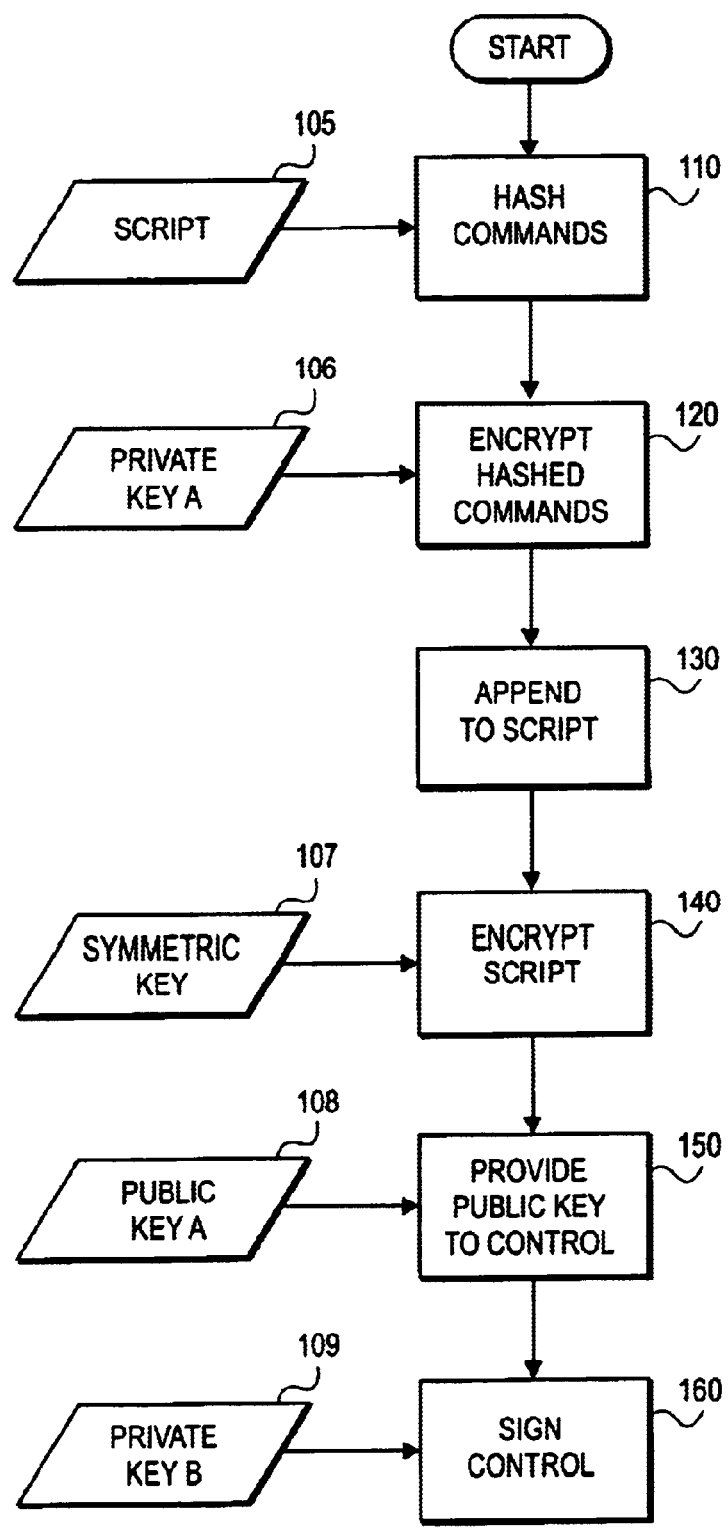
FIG. 1 is a flow chart illustrating an embodiment of the invention.

With reference to FIG. 1, the process starts at 110 with hashing the commands in the script. The script is written in a scripting language, such as JavaScript, and comprises executable commands to cause the client system upon which the script is executed to perform some function. The function may be defragmenting a hard disk drive accessible by the system upon which the script is executed, or providing interactive content in a Web page downloaded to a client system, e.g., online tutorial or help. The content of the script is not so important as is preventing unauthorized control of the script or unauthorized alteration of the script content in so much as an embodiment of the present invention is concerned.

Any well known or proprietary hashing function may be utilized to compute a hashed value for each executable command in the script. Each executable command is provided at 105 as the key value input to the hashing function, from which the hashing function computes a hashed value corresponding to the executable command. In one embodiment of the invention, each executable command may be hashed, while in other embodiments of the invention, some number of executable commands, e.g., one or more but less than all of the executable commands, may be hashed. In one embodiment of the invention, the hashing function utilizes public key A that is tied to the script, as described below, thus making it highly unlikely that the script was authored or edited by an unauthorized individual without access to the corresponding private key.

At 120, each hashed value is encrypted using well known asymmetric, i.e., public, key cryptography techniques. For example, each hashed value is encrypted using private key A 106. This process is also referred to in cryptography as creating a public key digital signature. Public key digital signatures provide a way to prove that the signed data was signed by one who had a copy of a particular private key, in this case, private key A.

The signed hashed values for the executable commands are embedded or appended to the script at 130. Alternatively, the hashed values may first be appended to the script and then signed. A public key A corresponding to the private key A may be appended to the script as well, or obtained from the public key authentication infrastructure, e.g., a certification authority. (A public file known as a certificate is issued by the certification authority and contains an entity's public key, identifying information, and a signature provided by the certification authority). At 140, the script, including the signed hashed values and public key, if present, may be encrypted using a symmetric key 107 to provide a second level of encryption. The encryption is not necessary for protection of the script, but hides the public key, if included in the script.

In a Web-enabled application, the script, encrypted or not as the case may be, is converted as appropriate for inclusion in a Web page. The public key A 108 corresponding to the private key A 106 is provided to control, i.e., interactive objects that provide interactive and user-controllable functions, in the Web page. In one embodiment of the invention, the Web page utilizes ActiveX control from Microsoft Corporation. The control is also signed at 160, to hide public key A provided therein at 150. The control is signed using a different private key, key B provided at 109. The script is ready for the execution process upon activation of the control by, e.g., a Java applet or a user clicking a button on the Web page.

Figure 2:
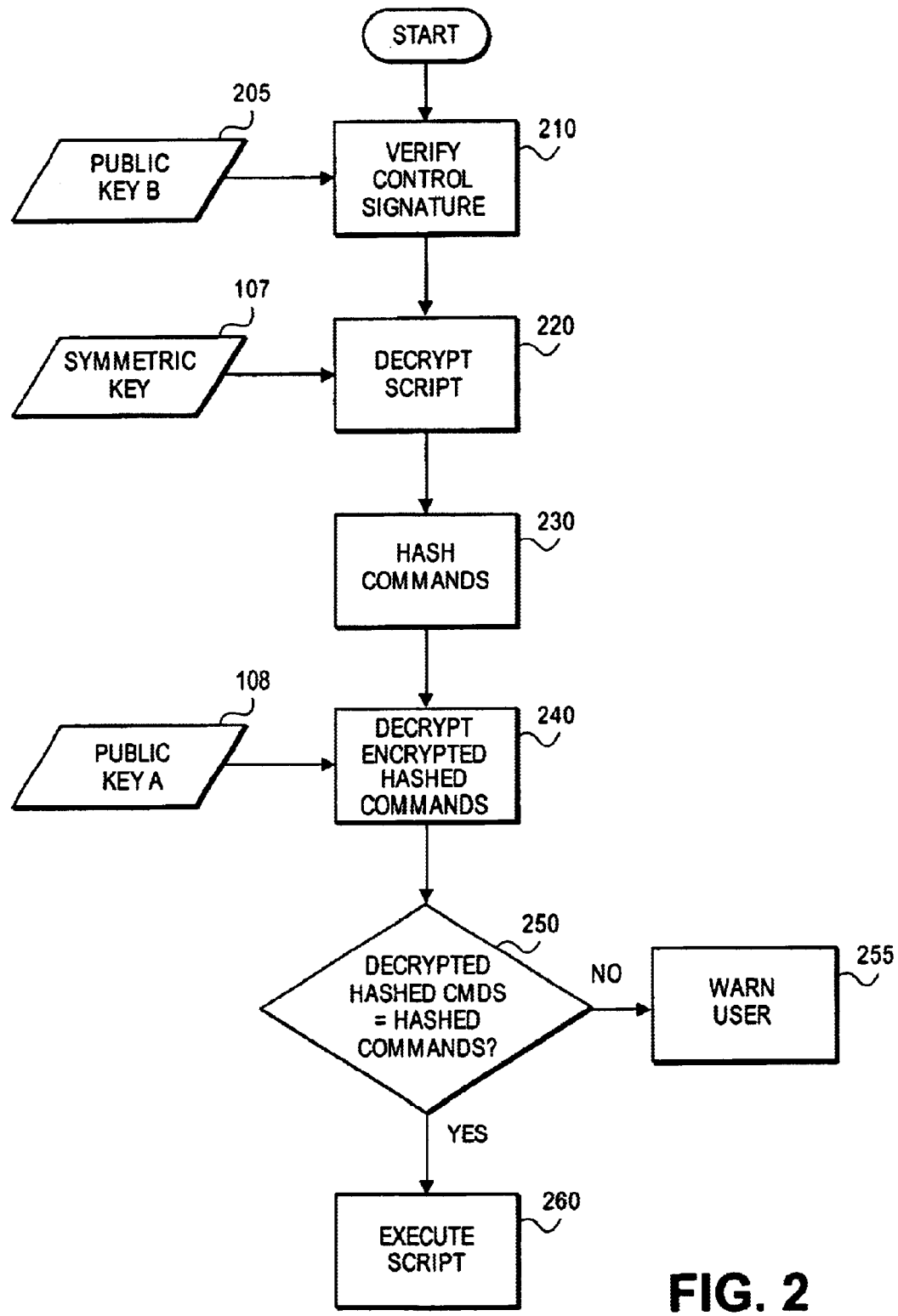
FIG. 2 is a flow chart illustrating an embodiment of the invention.

The process of securely executing the script is now described with reference to FIG. 2. In one embodiment of the invention, a user running a Web browser application visits a Web site and downloads a Web page containing interactive content. The user activates a control in the Web page, for example, by clicking on an applet. Recall from the above discussion that the control is signed at 160 with a public key digital signature using private key B 109. Thus, at 210, the signature is verified using public key B 205. Verification is accomplished by decrypting the signed control with public key B. If any change has occurred to either the control or the signature, it will be detected at 210. At 220, the script is decrypted with symmetric key 107. (Symmetric key encryption requires only one key that is shared by the encryption process and decryption process). Of course, the decryption is necessary only if the script was correspondingly encrypted at 140.

At 230, the executable commands in the script are hashed, using the same hashing function utilized at 110. The hashed commands that were encrypted and appended to the script at 120 and 130, respectively, are now decrypted at 240, using public key A, which was provided to the control at 150. The decrypted hashed commands are compared at 250 with the commands hashed at 230. If no changes in the script occurred between hashing and encrypting at 110 and 120, and hashing and decrypting at 230 and 240, the decrypted hashed commands obtained at 240 should be identical to the hashed commands obtained at 230, and the script may begin execution at 260. If, on the other hand, the commands hashed at 230 are not the same as the hashed commands decrypted at 240, the user is cautioned or warned, for example, by displaying a message in a pop up window or the like in a display screen for the client system. The user may, according to one embodiment of the invention, select to proceed with execution of the script. This is useful, for example, if a new version of the script is released, in which case hashed values for the commands in the old version of the script will not match the hashed values for the commands in the new version.

In one embodiment of the invention, the decrypted hashed commands are maintained so that a comparison between hashed command values and decrypted hashed command values may be performed before every execution of the script. Alternatively, a comparison is performed between execution of each command, to ensure there is no dynamic modification of the script or particular commands in the script. In each case, the user is warned as appropriate. In this manner, verification of the source and integrity of a script in an application, such as may be in a Web page, is accomplished.

What is claimed is:

1. A method for preventing unauthorized alteration of content, comprising:
   a) computing a hashed value for each executable command in a script;
   b) encrypting the hashed value for each executable command in the script with a first private key of a first asymmetric key pair;
   c) appending to the script the encrypted hashed values for each executable command;
   d) embedding a first public key corresponding to the first private key to an interface control, comprising a script; and
   e) signing the interface control, wherein signing the interface control comprises encrypting the interface control using a second private key of a second asymmetric key pair, the signature for the interface control for hiding the first public key provided therein, wherein the signed interface control is used to invoke the script.

2. The method of claim 1, wherein the interface control is an ActiveX control in an application program.

3. The method of claim 2, wherein the ActiveX control is in a HyperText Markup Language (HTML) document.

4. The method of claim 3, wherein the HTML document is downloaded from a HyperText Transfer Protocol (HTTP) server to a HTTP client.

5. A method for secure execution of content, comprising:
   a) verifying a signature associated with an interface control using a second public key from a second asymmetric key pair, the interface control comprising a script;
   b) computing a hashed value for each executable command in the script;
   c) decrypting an encrypted hashed value appended to the script for each executable command in the script using a first public key from a first asymmetric key pair to obtain a decrypted hashed value for each executable command in the script;
   d) comparing the computed hashed value for each executable command in the script with the corresponding decrypted hashed value for each executable command in the script; and
   e) executing the executable commands in the script if the computed hashed values for the executable commands in the script are the same as the corresponding decrypted hashed values appended to the script for the executable commands.

6. The method of claim 5, wherein if the script is an encrypted script, further comprising decrypting the encrypted script with a symmetric encryption key to obtain the script.

7. The method of claim 5, further comprising repeating b) and d) each execution of the executable commands in the script to prevent dynamic modification to the script.

8. The method of claim 5, wherein the script is in a HyperText Markup Language (HTML) document.

9. The method of claim 8, wherein the HTML document is downloaded to a Hypertext Transfer Protocol (HTTP) client from a HTTP server.

10. The method of claim 9 performed by an ActiveX control in the HTML document.

11. An article of manufacture comprising a machine accessible medium providing a plurality of machine readable instructions, wherein the instructions, when executed by a processor, cause the processor to:
   a) compute a hashed value for each executable command in a script;
   b) encrypt the hashed value for each executable command in the script with a first private key of a first asymmetric key pair;
   c) append to the script the encrypted hashed values for each executable command;
   d) embed a first public key corresponding to the first private key to an interface control comprising a script; and
   e) sign the interface control, wherein instructions to sign the interface control comprise instructions to encrypt the interface control using a second private key of a second asymmetric key pair, the signature for the interface control for hiding the first public key provided therein, wherein the signed interface control is used to invoke the script.

12. An article of manufacture comprising a machine accessible medium providing a plurality of machine readable instructions, wherein the instructions, when executed by a processor, cause the processor to:
   a) verify a signature associated with an interface control using a second public key from a second asymmetric key pair in response to activating the interface control, the interface control comprising a script;
   b) compute a hashed value for each executable command in the script;
   c) decrypt an encrypted hashed value appended to the script for each executable command in the script using a first public key from a first asymmetric key pair to obtain a decrypted hashed value for each executable command in the script;
   d) compare the computed hashed value for each executable command in the script with the corresponding decrypted hashed value for each executable command in the script; and
   e) execute the executable commands in the script if the computed hashed values for the executable commands in the script are the same as the corresponding decrypted hashed values appended to the script for the executable commands.

13. An apparatus, comprising:
   a server computer, the server computer including a database to house and serve web pages and a server processor to:
      compute a hashed value for each executable command in a script on a web page;
      encrypt the hashed value for each executable command in the script with a first private key of a first asymmetric key pair;
      append to the script the encrypted hashed values for each executable command;
      embed a first public key corresponding to the first private key to an interface control comprising a script; and
      sign the interface control, wherein to sign the interface control includes to encrypt the interface control using a second private key of a second asymmetric key pair, the signature for the interface control for hiding the first public key provided therein, wherein the signed interface control is used to invoke the script.

14. The apparatus of claim 13, further comprising:
   a client computer having a client processor and a browser to enable a client to download the web page over a network, the client processor to:
      compute a hashed value for each executable command in the script on the web page;
      decrypt an encrypted hashed value appended to the script for each executable command in the script to obtain a decrypted hashed value for each executable command in the script;
      compare the computed hashed value for each executable command in the script with the corresponding decrypted hashed value for each executable command in the script; and
      execute the executable commands in the script if the computed hashed values for the executable commands in the script are the same as the corresponding decrypted hashed values appended to the script for the executable commands.

15. A method for creating secure content comprising:
   a) hashing at least one executable command from a script in a web page to obtain a hashed value;
   b) encrypting the hashed value using a private key A to generate a signed hashed value;
   c) appending the signed hashed value to the script, wherein a public key A corresponding to the private key A is appended to the script; and
   d) providing the public key A to an interface control within the web page, wherein the interface control is signed using a private key B to hide the public key A.

16. The method of claim 15, wherein the script is enabled for execution upon activation of the signed interface control by a client receiving the web page.

17. The method of claim 16, wherein activation of the signed interface control comprises the client clicking one of an applet and a button on the Web page.

18. The method of claim 15, wherein the interface control comprises an ActiveX control.

19. The method of claim 15, wherein prior to appending the signed hashed value to the script, encrypting the script, including the signed hashed value and the public key A, to provide a second level of encryption.

20. The method of claim 19, wherein the second level of encryption comprises a symmetric key encryption.

21. The method of claim 15, wherein a client downloading the web page activates the signed interface control, the method further comprising:
   e) verifying the signed interface control using a public key B;
   f) computing a hashed value for the at least one executable command in the script using an identical hashing function from a);
   g) decrypting the at least one hashed executable command encrypted and appended to the script using public key A provided to the interface control;
   h) comparing the computed hashed value for the at least one executable command in the script with the corresponding decrypted hashed value for the at least one executable command in the script; and
   i) executing the executable commands in the script if the computed hashed values for the at least one executable command in the script are the same as the corresponding decrypted hashed values appended to the script for the at least one executable command.

22. The method of claim 1, wherein appending to the script the encrypted hashed values for each executable command further comprises appending the first public key corresponding to the first private key used to encrypt the hashed value.

23. The method of claim 1, wherein computing a hashed value for each executable command in the script comprises providing each executable command as a key value input to a hashing function, wherein the hashing function computes the hashed value corresponding to the executable.

24. The method of claim 23, wherein the hashing function utilizes the first public key, which is tied to the script.

25. The method of claim 1, further comprising encrypting the script, including the signed hashed values and the first public key, if present, with a symmetric key to provide another layer of encryption.

26. The method of claim 5, wherein prior to verifying a signature associated with an interface control comprising a script, downloading a web page to enable a user to activate the interface control, wherein the interface control is contained in the web page.

27. The method of claim 5, wherein verifying a signature associated with an interface control comprising a script comprises:

decrypting the signature associated with the interface control using the second public key, wherein the signature hides a first public key;

determining whether changes have occurred to either the interface control or the signature associated with the interface control; and detecting the changes, if the changes have occurred.

* * * * *